US008800862B1

(12) United States Patent
Dent et al.

(10) Patent No.: US 8,800,862 B1
(45) Date of Patent: Aug. 12, 2014

(54) FAST CASH AT ATM

(75) Inventors: Nathan Dent, Charlotte, NC (US); Stephen R. Crowley, Huntersville, NC (US); Matthew Fairbarn, Huntersville, NC (US); Joel Weiss, Monsey, NY (US); Ariela R. Yevick, Spring Valley, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/053,454

(22) Filed: Mar. 22, 2011

Related U.S. Application Data

(60) Provisional application No. 61/432,661, filed on Jan. 14, 2011.

(51) Int. Cl.
*G06Q 40/00* (2012.01)

(52) U.S. Cl.
USPC .......................................... 235/379; 235/382

(58) Field of Classification Search
USPC ......................... 705/39, 43, 44; 235/379, 380
See application file for complete search history.

(56) References Cited

U.S. PATENT DOCUMENTS

| | | | | |
|---|---|---|---|---|
| 7,552,868 | B1 * | 6/2009 | Block et al. | 235/379 |
| 2001/0032878 | A1 * | 10/2001 | Tsiounis et al. | 235/379 |
| 2010/0241562 | A1 * | 9/2010 | Bosch et al. | 705/41 |
| 2011/0145145 | A1 * | 6/2011 | Battaglini et al. | 705/43 |
| 2011/0258090 | A1 * | 10/2011 | Bosch et al. | 705/30 |
| 2012/0023018 | A1 * | 1/2012 | Carpenter et al. | 705/43 |
| 2012/0143756 | A1 | 6/2012 | Rielly et al. | |

* cited by examiner

*Primary Examiner* — Thien M Le

(74) *Attorney, Agent, or Firm* — Weiss & Arons LLP; Michael A. Springs, Esq.

(57) ABSTRACT

Apparatus and methods for an enhanced cash withdrawal transaction option are provided. The enhanced cash withdrawal transaction option may include using an ATM to display an initial ATM display. The initial ATM display may display multiple transaction options, the multiple transaction options including at least one cash withdrawal amount. Apparatus and methods for an additional enhanced cash withdrawal transaction are provided. The additional enhanced cash withdrawal transaction may enable a user to type an ATM PIN in an ATM keypad followed by a cash withdrawal amount. Apparatus and methods for an enhanced ATM customer display are also provided. The enhanced ATM customer display according to the systems and methods of the invention may customize an ordered ATM customer flow based on historical customer usage data.

15 Claims, 6 Drawing Sheets

FAST CASH AT ATM

CROSS-REFERENCE TO RELATED APPLICATION

This application claims the benefit of the filing date of U.S. Provisional Patent Application No. 61/432,661, filed Jan. 14, 2011, entitled "FAST CASH AT ATM," which is incorporated by reference herein in its entirety.

FIELD OF TECHNOLOGY

This invention relates to an enhanced cash withdrawal transaction. More specifically, this invention relates to an enhanced cash withdrawal transaction for use at Automated Teller Machines (ATMs).

BACKGROUND OF THE INVENTION

Many ATMs include a FAST CASH transaction option. The FAST CASH transaction option enables a customer to select a cash withdrawal amount instead of manually typing in a cash withdrawal amount.

Typically, the FAST CASH transaction option is one of multiple ATM transaction options included on an initial ATM display. In the event that a customer selects the FAST CASH transaction option, the customer is then presented with a second ATM display that includes multiple cash withdrawal amounts, e.g., $50, $100, $200 and $400. Selection of one of the cash withdrawal amounts prompts the ATM to dispense the selected cash amount.

It follows that a typical FAST CASH transaction requires a customer to execute at least three separate steps to initiate a cash withdrawal: (1) enter PIN, (2) select the FAST CASH transaction option and (3) select a cash withdrawal amount.

It would be desirable, therefore, to provide an improved ATM cash withdrawal transaction option that enables a customer to initiate a cash withdrawal in two or less steps.

Furthermore, an ATM customer's behavior typically includes of one or more actions/transactions.

It would be further desirable, therefore, to configure an ATM display to display ATM transaction option(s) that include the one or more actions/transactions that the ATM customer is likely to perform.

SUMMARY OF THE INVENTION

Systems and methods for providing an automated teller machine (ATM) configured to provide an enhanced cash withdrawal transaction option is provided. The ATM according to the systems and methods of the invention may include an ATM keypad that receives information corresponding to a personal identification number (PIN). The ATM may also include an ATM receiver that receives user identification information. The ATM may further include an ATM processor that determines if the information corresponding to the PIN corresponds to a valid PIN, the determination being based at least in part on the user identification information. The ATM may also include an ATM touch screen that displays, in the event that the ATM processor determines that the information corresponding to the PIN corresponds to a valid PIN, an initial ATM display that includes multiple transaction options, wherein the multiple transaction options include a cash withdrawal amount. The ATM may additionally include an ATM dispenser that dispenses the cash withdrawal amount in the event that an ATM central processing unit (CPU) receives information relating to a selection of the cash withdrawal amount included in the initial ATM display.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Enhanced ATM Cash Withdrawal Transactions

Figure 1:
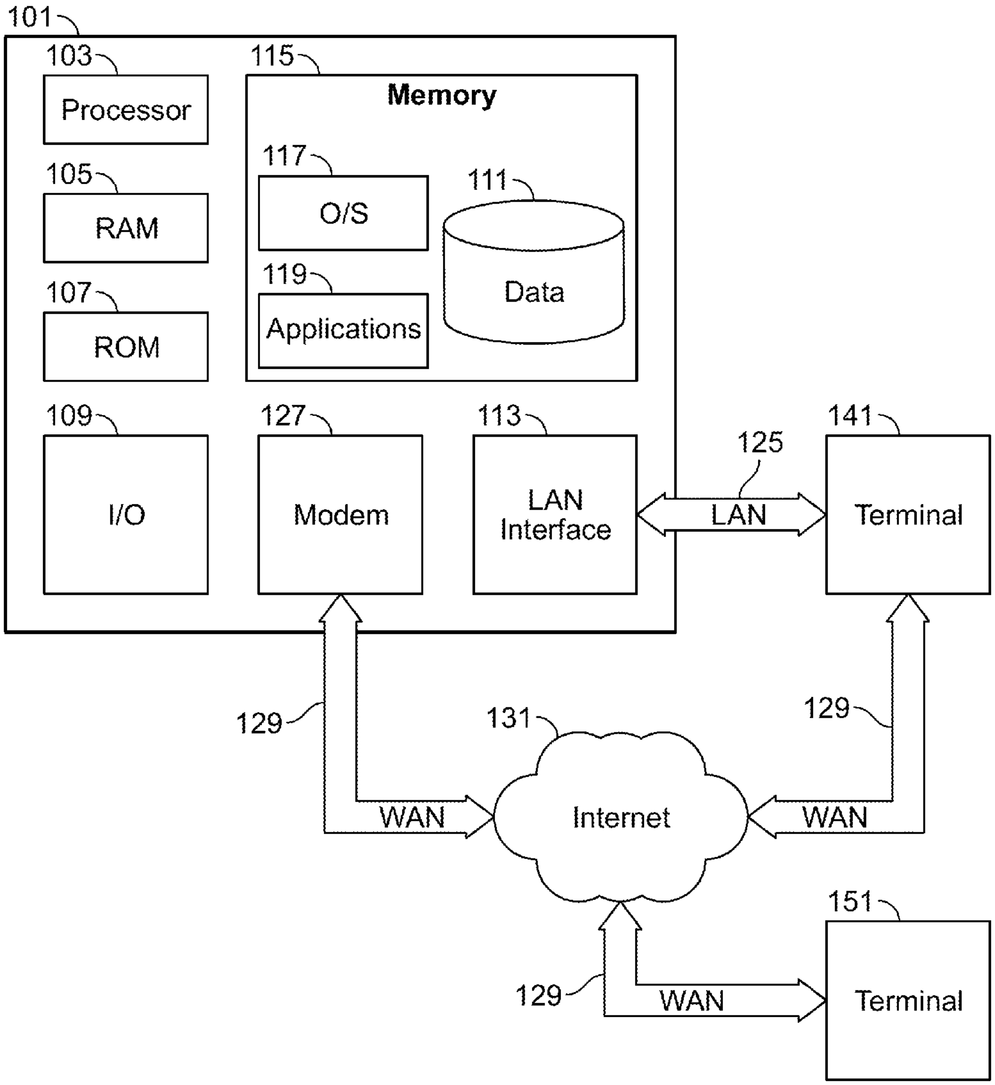
FIG. 1 shows apparatus that may be used in accordance with the principles of the invention.

An ATM customer typically activates an ATM session by entering user identification information at one or more ATM receivers and typing in his PIN at an ATM keypad. Upon verification of the PIN, the ATM displays an initial ATM display that includes multiple transaction options. The initial ATM display may be displayed on an ATM screen. The ATM screen may be a touch screen. The initial ATM display may be one of multiple ATM displays included in an ATM screen flow.

A FAST CASH transaction option is usually included in the initial ATM display. In the event that a customer selects the FAST CASH transaction option, the customer is presented with a second ATM display that displays predefined cash withdrawal amounts, e.g. $50, $100, $200 and $400. Selection of one of the predefined cash withdrawal amounts prompts the ATM to dispense the selected cash amount.

The systems and methods of the invention provide an enhanced ATM cash withdrawal transaction. The enhanced ATM cash withdrawal transaction may enable a customer to initiate a cash withdrawal using fewer steps than the number of steps required by a typical FAST CASH transaction.

1. Enhanced ATM Display

The systems and methods of the invention include an enhanced ATM display. The enhanced ATM display according to the systems and methods of the invention may enable a customer to initiate a cash withdrawal using fewer steps than the number of steps required by a typical FAST CASH transaction.

The enhanced ATM display may include one or more predefined cash withdrawal amounts. The enhanced ATM display may or may not additionally include a FAST CASH transaction option. In some embodiments, the enhanced ATM display may be a first ATM display presented to the customer. In other embodiments, the enhanced ATM display may be presented to the customer during an ATM session.

In an exemplary embodiment of the invention, a customer may initiate an ATM session by entering his PIN at an ATM keypad and swiping a customer bank card at an ATM card-holder. Upon verification of the PIN, the ATM may display to the customer an initial ATM display. The initial ATM display may include transactions options: DEPOSIT, WITHDRAW, CHECK YOUR BALANCE, $50, $100, $200, $300, $600 and OTHER FAST CASH TRANSACTIONS. Thus, these systems and methods enable the customer to initiate a cash withdrawal without having to first select a FAST CASH transaction option on an initial ATM display, as required by a typical FAST CASH transaction.

It should be noted that an ATM according to the systems and methods of the invention may verify an input user PIN using a PIN offset value stored in a magnetic stripe or other storage mechanism included on a bank card, barcode and/or a near field communications device that was in communication with an ATM receiver prior to the customer entering his PIN. The PIN offset value may correspond to the input user PIN but is "offset" by some predetermined value (or offset using a predetermined algorithm). Thus, the ATM may determine that the entered PIN is valid in the event that the entered PIN corresponds to the offset PIN after the ATM "offsets" the offset PIN or the entered PIN using the predetermined value/algorithm.

It should additionally be noted that an ATM according to the systems and methods of the invention may verify an input user PIN by determining if a data structure associated with received information corresponding to the input user PIN corresponds to a valid PIN. This determination may be based at least in part on input user identification information.

2. Personalized ATM Display

The systems and methods of the invention may also include a personalized ATM display. The personalized ATM display may be created by a customer via an online banking portal and/or phone banking. The customer may use personalized ATM option(s) included in the online banking portal and/or phone banking to modify one or more ATM transaction options, display attributes and/or any other suitable parameters included in one or more ATM displays. The ATM display(s) modified by the customer may be ATM display(s) available to the customer during an ATM session initiated via the customer's PIN and identification information.

For example, a customer may choose to personalize one or more ATM attributes via the online banking portal. The customer may then access the online banking portal from a personal computer (PC), a handheld device and/or a smart phone. The banking portal may present the customer with multiple selectable options. One or more of the multiple selectable options may relate to configuring one or more ATM parameters associated with an ATM session established by the customer. Exemplary ATM parameters available to be configured may include a default ATM language, a default email receipt v. print receipt functionality and/or transaction options that will be displayed on one or more ATM displays.

In the event that the customer executes a selection indicating his desire to modify the transaction options displayed on an initial ATM display, the banking portal may display to the customer one or more transaction options that may be created, selected and/or modified. Exemplary transaction options that the customer may create, select and/or modify may include a deposit transaction option, a withdrawal transaction option, a print transaction option, an e-mail statement transaction option and/or a cash withdrawal transaction option. The created, selected and/or modified transaction options may be subsequently displayed to the customer on an initial ATM display during a customer-initiated ATM session.

For example, the online banking portal may enable the customer to create and/or select a predefined cash withdrawal amount that he desires to be displayed on an initial ATM display that may be displayed during a customer-initiated ATM session. Additionally, the online banking portal may enable the customer to create new cash withdrawal amounts included on an ATM display displayed after the selection of a FAST CASH transaction option.

In an exemplary embodiment of the invention, a customer that frequently withdraws $480 from an ATM may use the systems and methods of the invention to add an ATM transaction option 'WITHDRAW 480' to an ATM display. The customer may choose to add the customized ATM transaction option to an initial ATM display. The customized ATM transaction option, when selected, may prompt the ATM to dispense $480. This is particularly desirable because a cash withdrawal amount of $480 is typically not included on an initial ATM display.

It should be noted that, in the event that a customer configures one or more ATM parameters using online banking and/or phone banking, the configured ATM parameters may be associated with one or more pieces of customer identification information, such as information included on a customer bank card, or in an ATM database. Thus, in the event that the ATM receives the one or more pieces of customer identification information, the ATM may include the configured ATM parameters on one or more ATM displays.

In some embodiments, the ATM may determine the configured ATM parameters to be included on the one or more ATM displays by transmitting information relating to entered user identification information to a remote server via a telecommunications network. The remote server may include stored data relating to the configured ATM parameters. Upon receipt of the information transmitted by the ATM, the remote server may inform the ATM CPU of any configured ATM parameters associated with the transmitted information.

3. Enhanced ATM Keypad Options—'Turbo Cash'

The systems and methods of the invention may further include enhanced ATM keypad options. The enhanced ATM keypad options may enable a customer to initiate a cash withdrawal using less ATM selections than those required by a typical FAST CASH transaction. These systems and methods may be referred to alternately as 'Turbo-Cash' transactions.

The enhanced ATM keypad options may include offering a customer the option of imputing a first and second set of numerical digits into an ATM keypad. For example, in some embodiments, the customer may be offered the option of (1) typing in his PIN and (2) upon completion of typing in his PIN, typing in an amount of cash that he desires to withdraw, i.e., a 'Turbo-Cash' amount.

In these embodiments, the ATM may first determine if a data structure associated with the first set of numerical digits correspond to a valid PIN. The ATM may base this determination, at least in part, on user identification information received from the customer. The user identification information may correspond to information included on a customer credit or debit card that was 'swiped' in an ATM card reader. The user identification information may alternately correspond to user biometric identification information, information received from a user barcode, cell phone and/or information received from a near field communications device.

In the event that the ATM determines that the data structure associated with the first set of numerical digits corresponds to a valid PIN, the ATM may subsequently determine if a data structure associated with the second set of numerical digits corresponds to a cash withdrawal amount. In some embodiments, the ATM may buffer the data relating to the PIN during this determination.

The cash withdrawal amount may be required to be selected from one of multiple cash withdrawal amounts. Alternately, the cash withdrawal amount may be required to be a multiple of one or more predetermined numbers. For example, a customer may be required to enter a cash withdrawal amount that is a multiple of the number 20. In yet other embodiments, the ATM may enable a customer to enter, following his PIN, any desired cash withdrawal amount. The aforementioned embodiments may be limited to a minimum and/or maximum cash withdrawal amount. The maximum cash withdrawal amount may relate to an amount of funds available in a customer account, a withdrawal limit associated with the customer account and/or a maximum withdrawal limit associated with the ATM.

In the event that the ATM processor determines that the data structure associated with second set of numerical digits corresponds to a cash withdrawal amount, an ATM cash dispenser may be configured to dispense the cash withdrawal amount.

In other embodiments of the invention, after determining that the data structure associated with second set of numerical digits corresponds to a cash withdrawal amount, the ATM may determine if a financial institution authorizes the dispensing of the cash. The financial institutions' authorization may depend at least in part on the value of the cash withdrawal amount, an existing customer account balance, a customer minimum account balance, a customer overdraft limit, a customer overdraft protection and/or any other suitable customer account information. In the event that the financial institution authorizes the dispensing of the cash, an ATM cash dispenser may be configured to dispense the cash withdrawal amount.

For example, an ATM customer with ATM PIN 7135 may desire to withdraw $400 from an ATM. The customer may initiate an ATM session and the withdrawal of $400 by typing "7135400" on an ATM keypad. In this embodiment, the ATM may verify that a data structure associated with the first four entered digits correspond to a valid PIN, that a data structure associated with the following three digits correspond to a cash withdrawal amount, and that a financial institution authorizes the ATM to dispense the cash withdrawal amount. In the event that the data structure associated with first four digits correspond to a valid PIN, the data structure associated with following three digits correspond to a cash withdrawal amount and a financial institution authorizes the transaction, the ATM may substantially immediately dispense $400.

It should be noted that the ATM may determine if the financial institution authorizes the dispensing of the cash by routing data relating to the PIN, the user identification information and/or the cash withdrawal amount to a third party via a telecommunications network. The third party may be an interbank network, an authorization system, or any other suitable platform configured to authorize one or more financial transactions. Some or all of the routed data may be in encrypted form. Any other suitable method may also be used to determine if a financial institution authorizes the dispensing of the cash withdrawal amount.

It should additionally be noted that in the event that the ATM determines that the entered PIN corresponds to a valid PIN and that (1) the numbers following the PIN do not correspond to a valid cash withdrawal amount and/or (2) the financial institution does not authorize the ATM to dispense the cash withdrawal amount, the ATM may subsequently display an initial ATM display. The initial ATM display may inform the customer of the lack of permission(s) to dispense the cash withdrawal amount. In some embodiments, the initial ATM display may also display the reason(s) associated with the denial of permissions, e.g. lack of sufficient funds, lack of authorization from a financial institution, invalid input withdrawal amount, etc.

Furthermore, in the event that the customer executes one or more ATM selections prior to the dispensing of the cash, the ATM may terminate the cash dispensing and, upon verification of the PIN, display an initial ATM display.

The systems and methods of the invention are not limited to a four digit PIN. Rather, the systems and methods of the invention may be extended to a PIN that includes any number of digits.

For example, an ATM customer with ATM PIN 71358 may desire to withdraw $400 from an ATM. The customer may initiate an ATM session and the withdrawal of $400 by typing "71358400" on an ATM keypad. In the event that a data structure associated with the first five digits correspond to a valid PIN, a data structure associated with the following three digits correspond to a cash withdrawal amount and a financial institution authorizes the transaction, the ATM may substantially immediately dispense $400.

The systems and methods of the invention may additionally include a short-hand numerical sequence to indicate an amount of cash that a customer desires to withdraw. For example, the ATM may associate a "1" following an entered PIN with a cash withdrawal amount of $100, a "2" following an entered PIN with a cash withdrawal amount of $200, etc. It follows that, in these embodiments, an ATM customer with ATM PIN 7135 that desires to withdraw $400 may initiate a cash withdrawal of $400 by entering '71354' into an ATM keypad.

In some embodiments of the invention, a customer may be required to type in a predetermined character upon completion of typing in his PIN and cash withdrawal amount. This predetermined character may be used to signal the ATM to begin verifying the validity of the entered PIN. For example, the predetermined character may be a "#" character. Thus, a customer with ATM PIN 7135 that desires to withdraw $400 may be required type "7135400#" in an ATM keypad to initiate a cash withdrawal of $400.

In other embodiments of the invention, the lapse of a predetermined duration of time following the receipt of information corresponding to an entered numerical sequence may be used to signal the ATM to begin validating the entered PIN.

In yet other embodiments of the invention, the ATM may require a customer to separate the numerical entry of his PIN from the numerical entry of his desired cash withdrawal amount using one or more predetermined characters. For example, a customer with ATM PIN 7135 that desires to withdraw $400 may be required to type "7135#400" in an ATM keypad to initiate a cash withdrawal of $400.

In these embodiments, the ATM may verify if the last four digits preceding the "#" character correspond to a valid ATM PIN. Upon verification that the last four digits preceding the "#" character correspond to a valid ATM PIN, the ATM may proceed to determine if the digits following the "#" correspond to a cash withdrawal amount. In the event that the digits following the "#" correspond to a cash withdrawal amount, the ATM may subsequently determine if a financial institution authorizes the ATM to dispense the cash withdrawal amount. In the event that the financial institution authorizes the ATM to dispense the cash withdrawal amount, the ATM may substantially immediately dispense the cash withdrawal amount.

It should be noted that any combination of the aforementioned systems and methods for entering an ATM PIN followed by a cash withdrawal amount may be used in additional embodiments of the systems and methods of the invention. It should additionally be noted that the systems and methods of the invention include any suitable sequence of determining the validity of a PIN, a cash withdrawal amount, authorization (s) of a financial institution and/or any other suitable determination.

After an ATM in accordance with the systems and methods of the invention dispenses the desired cash withdrawal amount, the ATM may subsequently display a graphical user interface that includes the option(s): OTHER TRANSACTION and/or TERMINATE SESSION. Alternately, after the dispensing of the cash, the ATM may display an initial ATM display that includes multiple transaction options. In other embodiments, after the dispensing of the cash, the ATM may automatically terminate the customer's ATM session. Thus, the user may be required to swipe his card and re-enter his PIN to execute another ATM transaction.

It should be noted that the systems and methods of the invention may include a predetermined number or sequence of numbers that, when entered following a customer's PIN and cash withdrawal amount, will initiate the termination of the ATM session after the dispensing of the cash. For example, a customer with ATM PIN 7135 who desires to withdraw $200 from his account and subsequently terminate his ATM session may enter "7135200*" to withdraw $200 and subsequently terminate his ATM session. In these embodiments, if the predetermined number or sequence of numbers is not received by the ATM during a predefined time span, the ATM may display an initial ATM display including multiple transaction options after the dispensing of the cash.

Enhanced ATM Transaction Options—'Turbo Transactions'

Typical ATM transaction methods require a customer to select a desired transaction from an ATM display prior to accessing the desired ATM transaction screen. Thus, a customer who chooses to execute a balance inquiry must, upon verification of his PIN, select a 'BALANCE INQUIRY' transaction option from an initial ATM display. Only after the execution of the 'BALANCE INQUIRY' selection will the customer be presented with the desired ATM Balance Inquiry transaction screen.

The systems and methods of the invention may include enhanced ATM transaction options. The enhanced ATM transaction options may enable a customer to view a desired ATM transaction screen substantially immediately after the verification of his PIN, independent of any additional steps. ATM transactions in accordance with these systems and methods may be referred to alternately as 'Turbo-Transactions.'

The systems and methods of the invention may include enabling a customer to type into an ATM keypad, following his PIN, a predetermined number. The predetermined number may be associated with an ATM transaction screen.

For example, an ATM display included on an ATM screen prior to a customer's initiation of an ATM session may include: "Balance Inquiry? Type PIN+1. FAST CASH transaction? Type PIN+2, etc." Thus, a customer with ATM PIN 7135 who desires to execute a balance inquiry may enter "71351" in an ATM keypad and an ATM in accordance with the systems and methods of the invention will, upon verification that the first four entered digits correspond to a valid PIN, display a Balance Inquiry ATM transaction screen substantially immediately after the PIN verification.

It should be noted that the systems and methods included in the Turbo-Cash embodiments and/or any combination of the systems and methods included in the Turbo-Cash embodiments may be applied to the systems and methods of the Turbo-Transaction embodiments as well. For example, the Turbo-Cash embodiments wherein an entered PIN and cash withdrawal amount are separated by a predetermined character may be applied to one or more suitable Turbo-Transaction embodiments as well.

Customized ATM Display

An ATM customer's behavior during an ATM session may typically include one or more actions/transactions. For example, a customer may usually pull a balance inquiry and withdraw $200 during an ATM session.

Systems and methods of the invention enable an ATM to generate a customized ATM display that includes the actions/transactions that the customer typically performs. These systems and methods may include using an ATM CPU to obtain the selectable ATM options that a customer is likely to select (referred to alternately hereinafter as "preferred ATM options" or "selectable ATM options associated with the PIN"). The preferred ATM options may be one or more selectable ATM options selected during one or more ATM sessions initiated via the customer's PIN and user identification information. The preferred ATM options may be selectable ATM options selected from an initial ATM display and/or one or more ATM displays available to the customer during an ATM session. Upon obtaining the preferred ATM options, an ATM display may display the preferred ATM options on one or more customized ATM displays.

For example, a customer may initiate an ATM session by entering a PIN in an ATM keypad and one or more pieces of user identification information at one or more ATM receivers. Upon verification of the validity of the PIN, the ATM may obtain the customer's preferred ATM options. Upon obtaining the customer's preferred ATM options, the ATM may display the preferred ATM options on one or more ATM displays.

The preferred ATM options may be obtained by accessing a database that includes stored data relating to selectable ATM options selected during ATM sessions initiated via the customer's PIN and user identification information. The data may be stored in one or more databases. For example, the data may be stored in a database included in, or accessible by, the Base24 authorization system (a software application available from ACI Worldwide Corp., Omaha, Nebr. under the trademark BASE24) and/or any other desirable interbank network, software application or authorization system.

An ATM processor or a different processor may obtain the preferred ATM options by accessing the database. After accessing the database, the ATM processor or the different processor may execute an algorithm configured to determine whether one or more of the stored selectable ATM options were selected during a predetermined time period. In the event that one or more of the stored selectable ATM options were selected during the predetermined time period, the ATM processor or the different processor may identify the one or more selectable ATM options as preferred ATM options.

The predetermined time period may be one month, two months, six months, one year or any other suitable time period. In some embodiments, in the event that the predetermined time period does not include a threshold number of stored selectable ATM options, the ATM may execute an algorithm that includes selectable ATM options selected during a time period longer than the predetermined time period.

In some embodiments, the database may include stored data relating to selectable ATM options selected during ATM sessions initiated via the customer's PIN and user identification information during the predetermined time period. In these embodiments, an ATM processor or a different processor may identify the selectable ATM options stored in the database as the preferred ATM options.

In other embodiments, an ATM processor or a different processor may execute the algorithm configured to determine whether one or more of the stored selectable ATM options were selected during the predetermined time period. The ATM processor or the different processor may then determine if the stored selectable ATM options that were selected during the predetermined time period were selected at a rate that surpasses a predetermined threshold rate. In these embodiments, in the event that one or more of the stored selectable ATM options were selected during the predetermined time period at a rate that surpasses the predetermined threshold rate, the ATM processor or the different processor may identify the one or more selectable ATM options as preferred ATM options.

In some embodiments, the database may include stored data relating to selectable ATM options selected during ATM sessions initiated via the customer's PIN and user identification information during the predetermined time period. In these embodiments, an ATM processor or a different processor may identify the selectable ATM options stored in the database that were selected at a rate that surpasses the predetermined threshold rate as the preferred ATM options.

The predetermined threshold rate may be a defined number. For example, in the embodiments wherein the predetermined threshold rate is ten selections and the predetermined time period is three months, a selectable ATM option that was selected ten or more times during the three-month period prior to the initiation of the current ATM session may be identified as a preferred ATM option. In other embodiments, the predetermined threshold rate may be determined by comparing the rate of selection of all previously-selected ATM options and choosing, for example, the third-highest rate to become the threshold rate.

In the embodiments wherein a processor different from the ATM processor is used to identify the one or more preferred ATM options, the ATM processor may communicate with the different processor via a telecommunications network to obtain the one or more preferred ATM options. It should be noted that, in some embodiments, the different processor may be remotely located from the ATM processor.

For example, after receiving information relating to a PIN and user identification information, an ATM may transmit information relating to the user identification information over a telecommunications network to an electronic system. The electronic system may be an authorization system, interbank network and/or software application. The electronic system may be in electronic communication with the different processor and/or a database that stores information computed by the different processor. The ATM may query the electronic system to determine whether one or more preferred ATM options are associated with the user identification information.

The electronic system may transmit information to the ATM relating to preferred ATM option(s) associated with the PIN and/or user identification information. Upon receipt of information corresponding to the preferred ATM option(s), the ATM may generate a customized display that includes the preferred ATM options. It should be noted that in some embodiments, the electronic system may be configured to transmit to the ATM the format of the customized display.

In some embodiments, the customized display may include one or more preferred ATM options in addition to a selectable ATM option labeled OTHER TRANSACTION. For example, a customer who usually pulls a balance inquiry and withdraws $200 during an ATM session may be presented with an initial customized ATM display that includes three options: BALANCE INQUIRY, $200 and OTHER TRANSACTION.

In other embodiments, the customized display may include the preferred ATM options in addition to one or more predetermined selectable ATM options. In some of these embodiments, the preferred ATM options may be displayed in a prominent location on the customized display and/or be displayed in a designated area that may be labeled, for example, 'Your Preferred Transaction(s).' Furthermore, the number of predetermined selectable ATM options displayed in addition to the preferred ATM options may vary depending on the number of preferred ATM options included in the customized ATM display.

It should be noted that in the event that the ATM determines that there are no preferred ATM options associated with the entered PIN and user identification information, the ATM may display a default ATM display upon verification of the PIN. The default ATM display may differ from a customized display displayed in the event that the ATM determines preferred ATM options associated with an entered PIN and user identification information.

The systems and methods of the invention have been illustrated in the context of selected embodiments. It should be understood that features shown in connection with one of the embodiments may be practiced in accordance with the principles of the invention along with features shown in connection with another of the embodiments.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 111, and any other suitable information, may be stored in memory 115.

One or more of applications 119 may include one or more algorithms that may be used to execute one or more customized ATM displays and/or enhanced FAST CASH withdrawal transactions in accordance with the systems and methods of the invention.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
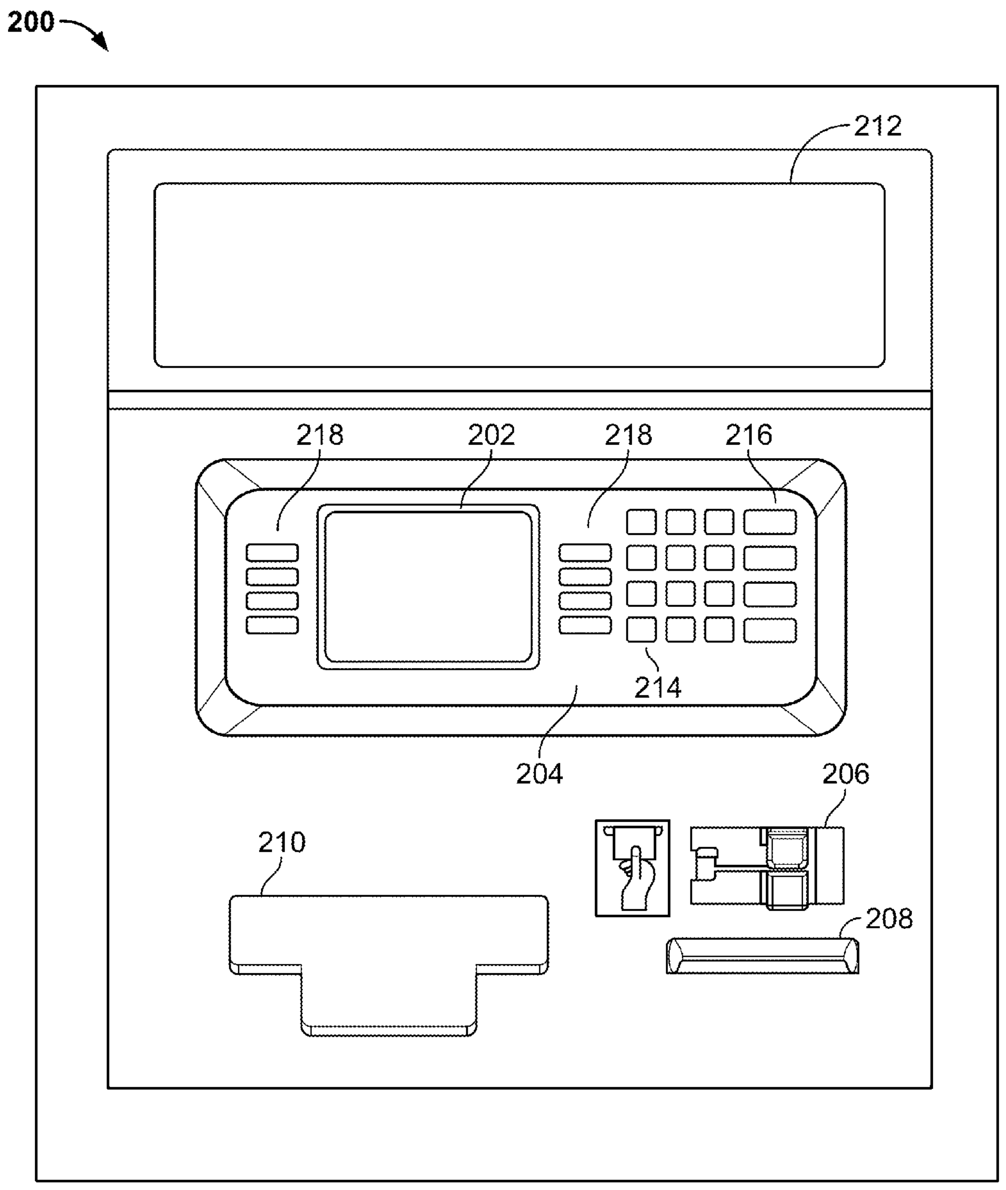
FIG. 2 shows a schematic diagram of hardware apparatus for use according to the principles of the invention.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter numerical and textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards. The transaction instrument may also be a chip, an RFID tag, a smart card, a PDA, a mobile phone or any other suitable device. In some embodiments, self-service device 200 may also include (not shown) a contactless chip reader, a wireless transceiver, a near field communications transceiver, a barcode reader or any other suitable receiver and/or interface configured to exchange and/or receive information from a transaction and/or electronic instrument. The information exchanged and/or received may include user identification information, transaction information or any other suitable information.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

Item dispenser 210 may dispense items. For example, item dispenser 210 may dispense bills.

Security screen 212 may visually screen a surveillance device (not shown). The surveillance device may provide video information about individuals that are present near the self-service device and the conditions there.

Figure 3:
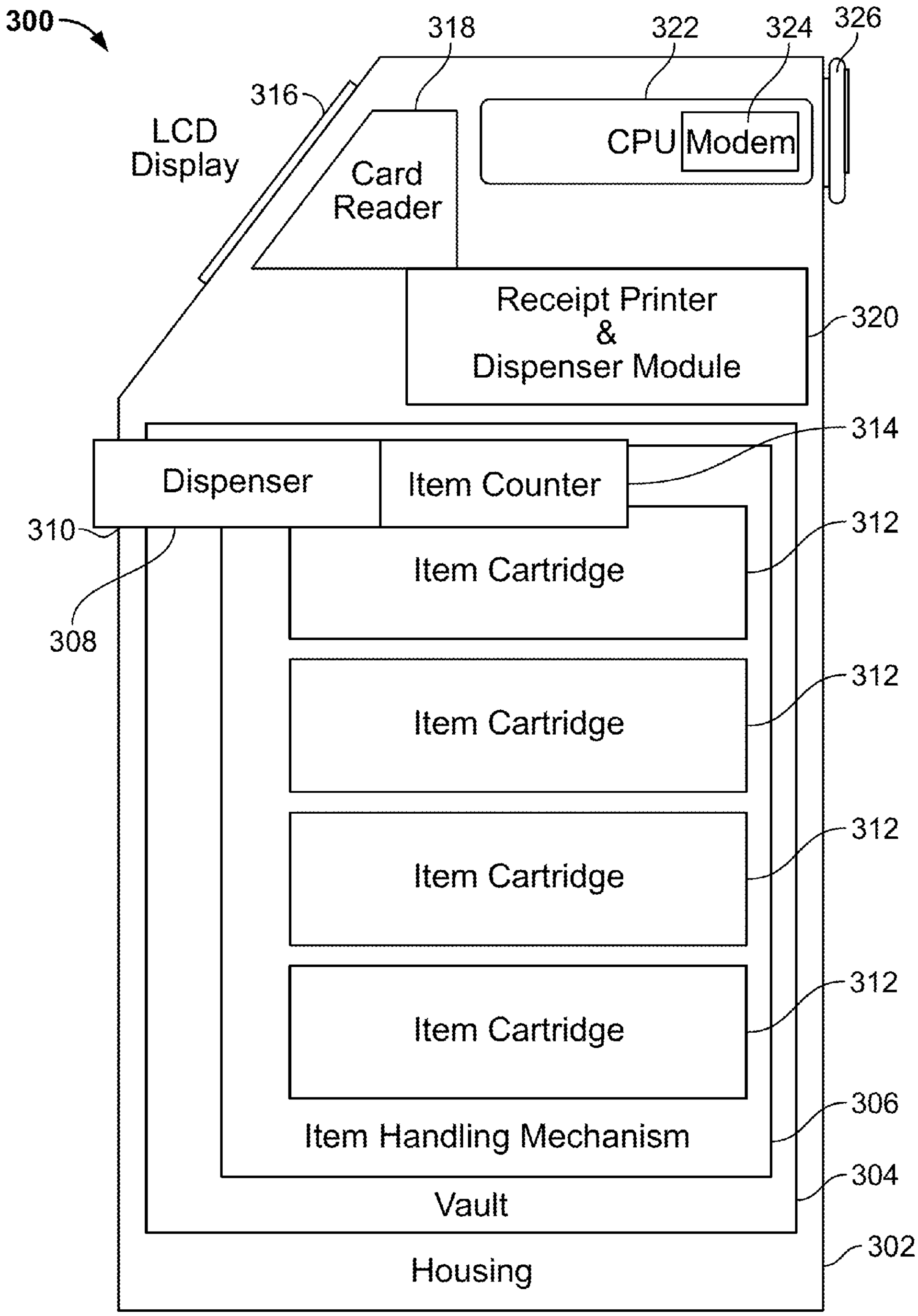
FIG. 3 shows another schematic diagram of hardware apparatus for use according to the principles of the invention.

FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 320 may control customer I/O, dispensing processes, which may include initialization, actuation, dispensing and any other suitable processes, receipt printing and dispensing, transaction channel communications and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
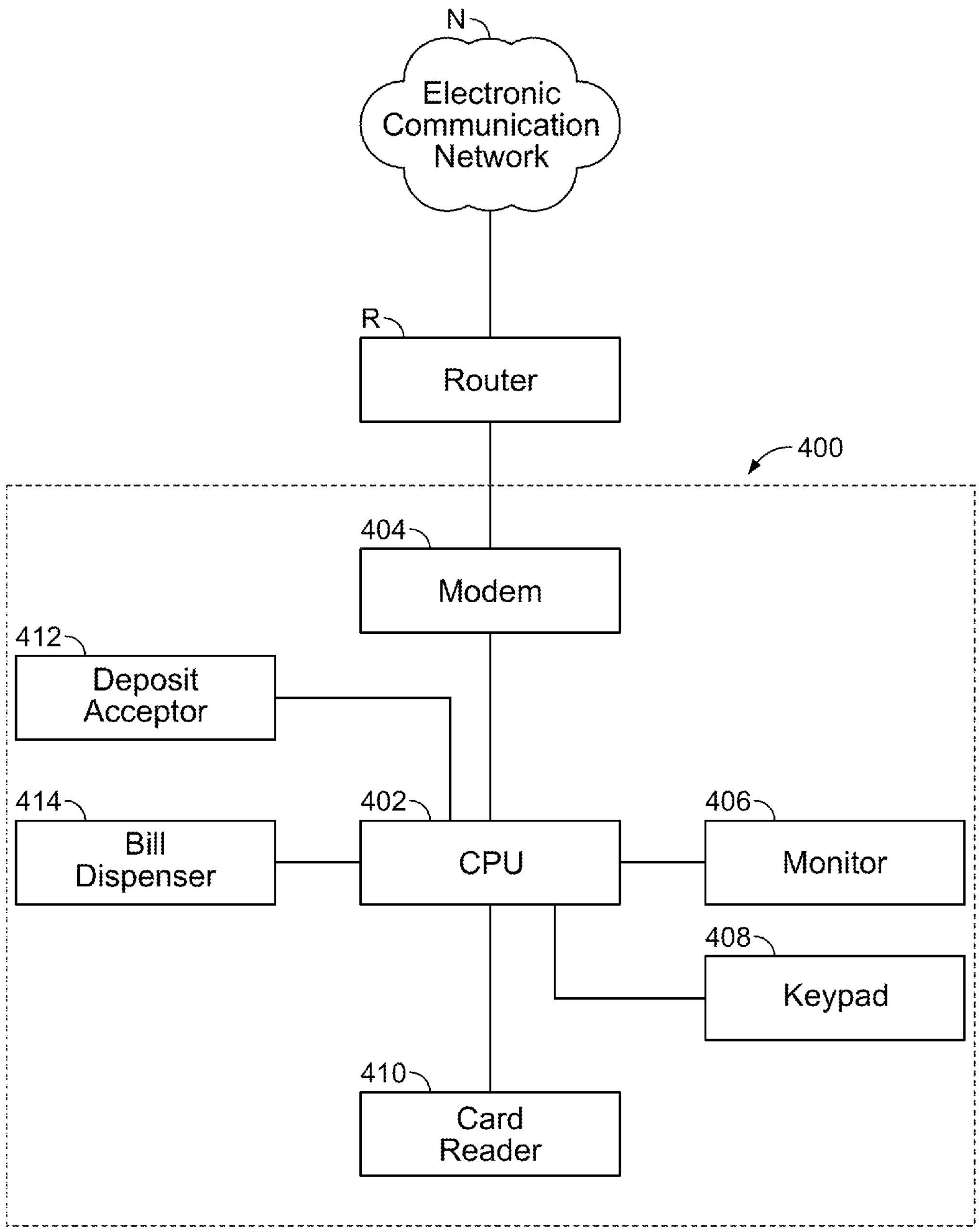
FIG. 4 shows additional apparatus that may be used in accordance with the principles of the invention.

FIG. 4 shows control system 400 for controlling a self-service device such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

In certain embodiments of the invention, CPU 402 may receive transaction information from keypad 408 and/or card reader 410 that corresponds to a PIN and/or user identification information. In such circumstances, CPU 402 may preferably communicate such information to network N via modem 404, which is in communication with router R.

It should be noted that prior to communicating with the network via router R, CPU 402 may verify the PIN received from the user with a PIN offset value stored on the magnetic stripe, or other storage mechanism, on the bank card. The PIN offset value may correspond to the input user PIN but is "offset" by some predetermined value (or by using a predetermined algorithm) in order to prevent fraudulent use of the bank card by a third party.

Figure 5:
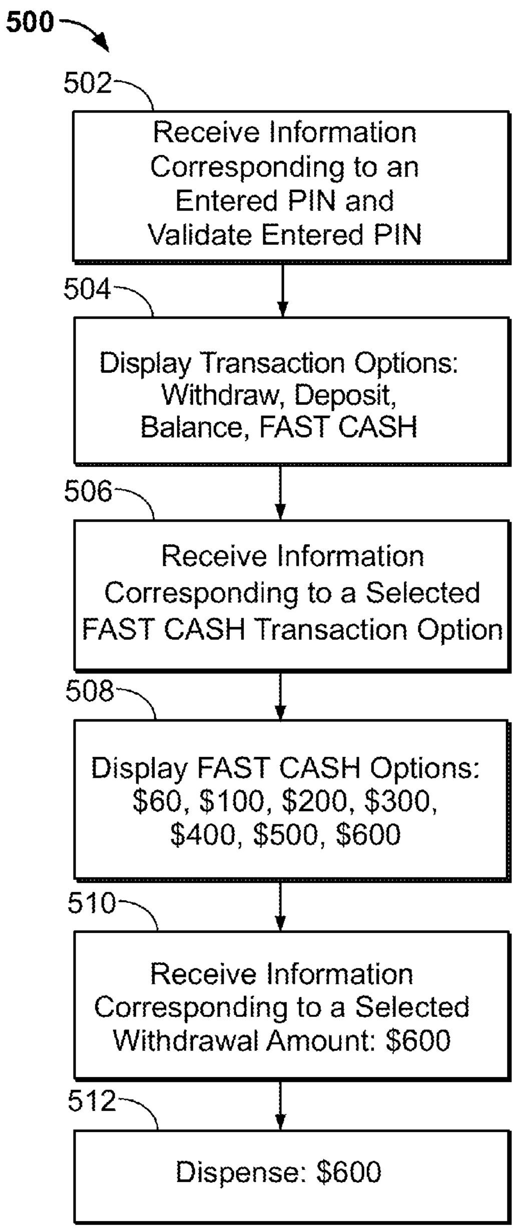
FIG. 5 (Prior Art)
FIG. 5 shows a process typically found in the prior art.

FIG. 5 shows process 500. Process 500 may be in accordance with commonly practiced prior art. Process 500 may initiate at step 502. At step 502, an ATM central processing unit (CPU) may receive information corresponding to an entered PIN and validate the entered PIN. At step 504, an ATM display may display transaction options: Withdraw, Deposit, Balance, FAST CASH. At step 506, the ATM CPU may receive information corresponding to a selected FAST CASH transaction option. At step 508, the ATM display may display FAST CASH transaction options: $60, $100, $200, $300, $400, $500 and $600. At step 510, the ATM CPU may receive information corresponding to a selected withdrawal amount: $600. At step 512, an ATM dispenser may dispense $600.

Figure 6:
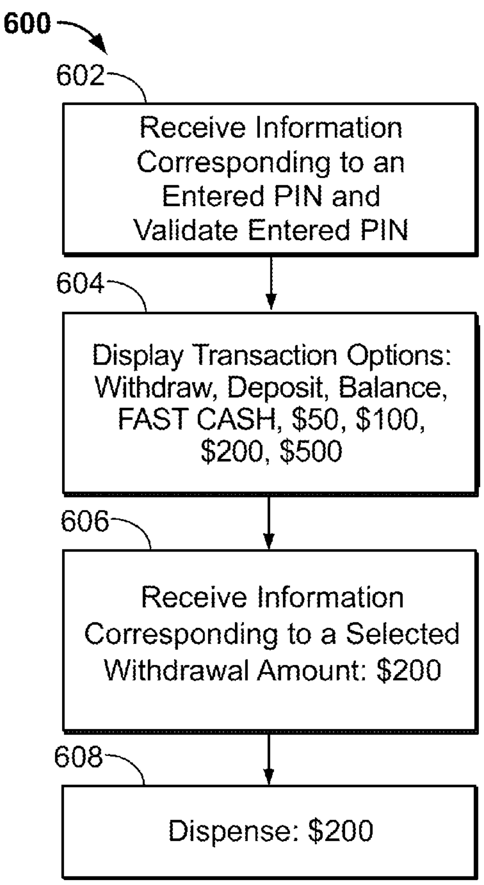
FIG. 6 shows a process in accordance with the systems and methods of the invention.

FIG. 6 shows illustrative process 600 in accordance with systems and methods of the invention. Process 600 may initiate at step 602. At step 602, an ATM CPU may receive information corresponding to an entered PIN and validate the entered PIN. At step 604, an ATM display may display transaction options: Withdraw, Deposit, Balance, FAST CASH, $50, $100, $200, $500. At step 606, the ATM CPU may receive information corresponding to a selected withdrawal amount: $200. At step 608, an ATM dispenser may dispense $200.

Figure 7:
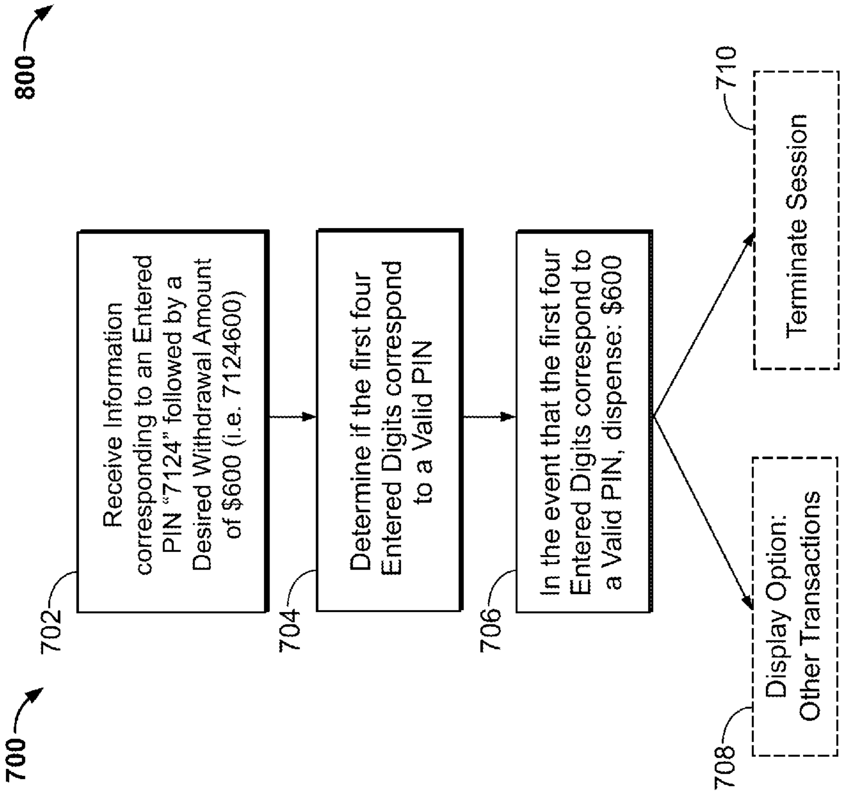
FIG. 7 shows another process in accordance with the systems and methods of the invention.

FIG. 7 shows illustrative process 700 in accordance with systems and methods of the invention. FIG. 7 may initiate at step 702. At step 702, an ATM CPU may receive information corresponding to an entered PIN '7124' followed by a desired withdrawal amount of $600 (i.e., 7124600). At step 704, the ATM CPU may determine if the first four entered digits correspond to a valid PIN. In the event that the first four entered digits correspond to a valid PIN, process 700 may continue at step 706. At step 706, an ATM dispenser may dispense $600. Process 700 may optionally proceed at step 708. At step 708, an ATM display may display a transaction option: Other Transactions. Process 700 may alternately optionally proceed at step 710. At step 710, the ATM CPU may terminate the initiated ATM session.

Figure 8:
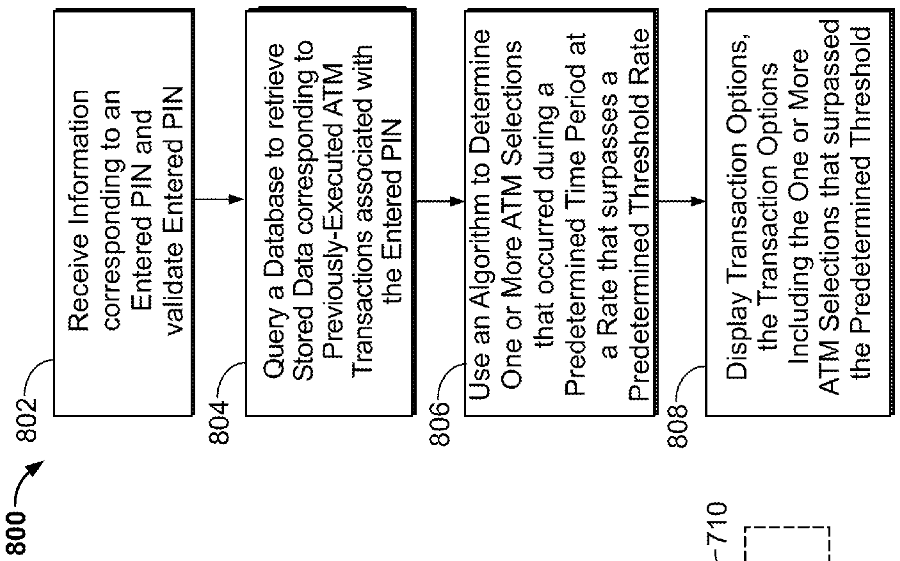
FIG. 8 shows yet another process in accordance with the systems and methods of the invention.

FIG. 8 shows illustrative process 800 in accordance with systems and methods of the invention. Process 800 may initiate at step 802. At step 802, an ATM CPU may receive information corresponding to an entered PIN and validate the entered PIN. At step 804, the ATM CPU may query a database to retrieve stored data corresponding to previously-executed ATM transactions associated with the entered PIN. At step 806, the ATM CPU may use an algorithm to determine one or more ATM selections that occurred during a predetermined time period at a rate that surpasses a predetermined threshold rate. At step 808, an ATM display may display transaction options. The displayed transaction options may include the one or more ATM selections that surpassed the predetermined threshold.

Thus, methods and apparatus for an enhanced ATM cash withdrawal transaction and an enhanced ATM display according to the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An automated teller machine (ATM) configured to provide an enhanced cash withdrawal transaction option, the ATM comprising:

an ATM keypad configured to receive information corresponding to a numerical input, the numerical input comprising at least a first set of numerical digits corresponding to a Personal Identification Number ("PIN") and a second set of numerical digits corresponding to a cash withdrawal amount;

an ATM receiver configured to receive user identification information;

an ATM processor configured to determine if the first set of numerical digits corresponds to a valid PIN or to receive a determination if the first set of numerical digits corresponds to a valid PIN, the determination being based at least in part on the user identification information, wherein the ATM keypad is configured to receive the second set of numerical digits prior to determining whether the first set of numerical digits corresponds to the valid PIN or prior to receiving the determination whether the first set of numerical digits corresponds to the valid PIN;

in the event that the ATM processor determines, or receives a determination that, the first set of numerical digits corresponds to a valid PIN, the ATM processor being further configured to determine if the second set of numerical digits corresponds to a cash withdrawal amount or to receive a determination that the second set of numerical digits corresponds to a cash withdrawal amount;

in the event that the ATM processor determines, or receives a determination that, the second set of numerical digits corresponds to a cash withdrawal amount, the ATM processor being further configured to determine if a financial institution authorizes the ATM to dispense the cash withdrawal amount or to receive a determination that the financial institution authorizes the ATM to dispense the cash withdrawal amount; and an ATM cash dispenser being configured to dispense the cash withdrawal amount in the event that the ATM processor determines, or receives a determination that, the financial institution authorizes the ATM to dispense the cash withdrawal amount, wherein:

the ATM processor is configured to determine if the financial institution authorizes the ATM to dispense the cash withdrawal amount by routing information relating to the user identification information and the second set of numerical digits to a third party via a telecommunications network.

2. The ATM of claim 1 wherein the ATM keypad is further configured to receive information corresponding to the second set of numerical digits substantially immediately following the receipt of information corresponding to the first set of numerical digits.

3. The ATM of claim 1 wherein the ATM processor is further configured to route at least some of the information in encrypted form.

4. The ATM of claim 1 wherein the third party is an interbank network.

5. The ATM of claim 1 wherein the third party is an authorization system.

6. The ATM of claim 1 further comprising, in the event that the ATM cash dispenser has completed dispensing the cash withdrawal amount, an ATM touch screen configured to display an initial ATM display comprising multiple transaction options.

7. The ATM of claim 1 further comprising, in the event that the ATM cash dispenser has completed dispensing the cash withdrawal amount, an ATM central processing unit configured to terminate an ATM session initiated via the PIN and the user identification information.

8. A computer readable medium having code stored thereon which, when executed by a processor, provides an enhanced cash withdrawal transaction option, the method comprising:

using an ATM keypad to receive information corresponding to a numerical input, the numerical input comprising at least a first set of numerical digits corresponding to a Personal Identification Number ("PIN") and a second set of numerical digits corresponding to a cash withdrawal amount;

using an ATM receiver to receive user identification information;

using an ATM processor to determine if the first set of numerical digits corresponds to a valid PIN, the determination being based at least in part on the user identification information, wherein the ATM keypad is configured to receive the second set of numerical digits prior to determining whether the first set of numerical digits corresponds to the valid PIN;

in the event that the ATM processor determines that the first set of numerical digits corresponds to a valid PIN, using the ATM processor to determine if the second set of numerical digits corresponds to a cash withdrawal amount;

in the event that the ATM processor determines that the second set of numerical digits corresponds to a cash withdrawal amount, using the ATM processor to determine if a financial institution authorizes the ATM to dispense the cash withdrawal amount; and using an ATM cash dispenser to dispense the cash withdrawal amount in the event that the ATM processor determines that the financial institution authorizes the ATM to dispense the cash withdrawal amount, wherein:

the ATM processor is configured to determine if the financial institution authorizes the ATM to dispense the cash withdrawal amount by routing information relating to the user identification information and the second set of numerical digits to a third party via a telecommunications network.

9. The computer readable medium of claim 8 further comprising using the ATM keypad to receive information corresponding to the second set of numerical digits substantially immediately following the receipt of information corresponding to the first set of numerical digits.

10. The computer readable medium of claim 8 further comprising using the ATM processor to route at least some of the information in encrypted form.

11. The computer readable medium of claim 8 wherein, in the method, the third party is an interbank network.

12. The computer readable medium of claim 8 wherein, in the method, the third party is an authorization system.

13. The computer readable medium of claim 8 further comprising, in the event that the ATM cash dispenser has completed dispensing the cash withdrawal amount, using an ATM touch screen to display an initial ATM display comprising multiple transaction options.

14. The computer readable medium of claim 8 further comprising, in the event that the ATM cash dispenser has completed dispensing the cash withdrawal amount, using an ATM central processing unit to terminate an ATM session initiated via the PIN and the user identification information.

15. An automated teller machine (ATM) configured to provide an enhanced cash withdrawal transaction option, the ATM comprising:

an ATM keypad configured to receive information corresponding to a numerical input, the numerical input comprising at least a first set of numerical digits corresponding to a Personal Identification Number ("PIN") and a second set of numerical digits corresponding to a cash withdrawal amount, wherein the ATM keypad is configured to receive the second set of numerical digits prior to determining whether the first set of numerical digits corresponds to the valid PIN;

an ATM receiver configured to receive user identification information;

an ATM processor configured to route to an electronic communication network the first set of numerical digits and the user identification information for determination of the validity of the PIN, and the second set of numerical digits for authorization to dispense the cash withdrawal amount; and in the event that the ATM processor receives information from the electronic communication network establishing the validity of the PIN and authorizing the cash withdrawal amount, an ATM cash dispenser being configured to dispense the cash withdrawal amount.

* * * * *